United States Patent [19]
Shimmell

[11] Patent Number: 5,922,264
[45] Date of Patent: Jul. 13, 1999

[54] METHOD FOR CASTING AN ARTICLE IN MULTIPLE PORTIONS

[75] Inventor: Dennis S. Shimmell, Hudsonville, Mich.

[73] Assignee: Nelson Metal Products Corporation, Grandville, Mich.

[21] Appl. No.: 08/962,907

[22] Filed: Nov. 3, 1997

Related U.S. Application Data

[62] Division of application No. 08/691,171, Aug. 1, 1996, Pat. No. 5,762,969.

[51] Int. Cl.⁶ .......................... B29C 39/10; B29C 45/14; B22D 19/00
[52] U.S. Cl. .......................... 264/255; 164/94; 164/303; 249/102; 425/112; 425/130; 425/195
[58] Field of Search ........................................ 425/120, 130, 425/112, 183, 192 R, 195, 573; 249/102; 264/245, 255, 328.7, 242; 164/94, 303

[56] References Cited

U.S. PATENT DOCUMENTS

| | | |
|---|---|---|
| 309,439 | 12/1884 | Chillingworth et al. . |
| 842,477 | 1/1907 | Lodor . |
| 1,341,461 | 5/1920 | Gruss et al. . |
| 1,834,746 | 12/1931 | Short . |
| 1,939,467 | 12/1933 | Short et al. . |
| 2,044,897 | 6/1936 | Boegehold et al. . |
| 2,060,034 | 11/1936 | Chandler . |
| 2,086,841 | 7/1937 | Bagley et al. . |
| 2,226,408 | 12/1940 | Nast . |
| 2,285,583 | 6/1942 | Jennings et al. . |
| 2,319,607 | 5/1943 | Kevorkian et al. . |
| 2,331,584 | 10/1943 | Underwood . |
| 2,371,399 | 3/1945 | Mantle . |
| 2,465,329 | 3/1949 | Murray . |
| 2,490,548 | 12/1949 | Schultz . |
| 3,088,783 | 5/1963 | Conover . |
| 3,319,300 | 5/1967 | Hehl . |
| 3,790,236 | 2/1974 | Pierce . |
| 3,917,789 | 11/1975 | Heisler . |
| 3,995,357 | 12/1976 | Boggs et al. . |
| 4,154,900 | 5/1979 | Kaku et al. . |
| 4,157,883 | 6/1979 | Mares . |
| 4,160,309 | 7/1979 | Scholle . |
| 4,351,530 | 9/1982 | Bertozzi . |
| 4,416,602 | 11/1983 | Neumeister . |
| 4,571,209 | 2/1986 | Manning et al. ........................ 264/242 |
| 4,576,875 | 3/1986 | Olsson et al. . |
| 4,641,701 | 2/1987 | Yamamoto .............................. 264/242 |
| 4,711,621 | 12/1987 | Schomblond . |
| 5,199,170 | 4/1993 | Mori et al. . |
| 5,244,746 | 9/1993 | Matsui et al. . |
| 5,372,767 | 12/1994 | Zimmermann et al. ................. 264/255 |
| 5,458,361 | 10/1995 | Gajewski ................................ 264/255 |
| 5,472,655 | 12/1995 | Morita ..................................... 264/245 |
| 5,670,184 | 9/1997 | Nakamichi et al. .................... 264/255 |
| 5,814,252 | 9/1998 | Gouldson et al. ....................... 264/255 |

FOREIGN PATENT DOCUMENTS

| | | |
|---|---|---|
| 0167320 | 1/1986 | European Pat. Off. . |
| 3423306 | 1/1986 | Germany . |
| 52-5071 | 1/1977 | Japan . |
| 60-224515 | 11/1985 | Japan . |
| 60-247520 | 12/1985 | Japan . |
| 62-273813 | 11/1987 | Japan . |
| 3-230925 | 10/1991 | Japan . |

*Primary Examiner*—Jill L. Heitbrink
*Attorney, Agent, or Firm*—Warner Norcross & Judd LLP

[57] ABSTRACT

A mold assembly for casting or molding a multiple portion article in sequential shots without opening the mold assembly. The mold assembly includes a movable mold insert that permits the portions to be interconnected as an integral part of the casting process. The mold insert includes a first or male void for defining a male end and a second or female void for defining a female end. In operation, the mold insert is placed in a first position and molten material is introduced into a first cavity portion to form a first portion with a male end. The mold insert is then placed in a second position with the female portion surrounding the male end of the first portion. Molten material is introduced into a second cavity portion to form a second portion with a female end at least partially surrounding the male end of the first portion.

12 Claims, 6 Drawing Sheets

METHOD FOR CASTING AN ARTICLE IN MULTIPLE PORTIONS

This is a divisional of application Ser. No. 08/691,171, filed Aug. 1, 1996, now U.S. Pat. No. 5,762,969.

BACKGROUND OF THE INVENTION

The present invention relates to casting and molding equipment, and more particularly to a mold assembly into which molten material is introduced to create an article.

Casting and molding processes are commonly used to manufacture articles from a variety of different industrial materials such as metal, plastic, and ceramic. A conventional casting or molding apparatus includes a die or mold assembly defining a cavity in the shape of the desired article and a material delivery system for introducing material into the cavity. In general, these processes involve the steps of (1) changing the material into its liquid state, (2) pouring or injecting the material into the die or mold cavity, (3) allowing the material to cure, (4) opening the die or mold assembly to provide access to the article, and (5) removing the article from the mold cavity. The die or mold assembly can be closed and the process repeated for the desired number of articles.

In view of (1) the flow characteristics of the molten material and (2) practical limitations on the capacities of molds and material-delivery systems, there are limitations on the size and shape of articles that can be cast or molded. For example, the cohesive nature of the molten material and the friction inherent in the mold cavity can make it difficult and sometimes impossible to completely fill a large or complex mold cavity using conventional pouring and injecting techniques. To overcome this shortcoming, large articles are sometimes cast in separate parts that are assembled after casting using conventional methods, such as welding, adhesives, and mechanical fasteners. The assembly steps add to the cost of manufacture, present quality control issues, and are not suitable for many large articles.

SUMMARY OF THE INVENTION

The aforementioned problems are overcome by the present invention wherein a mold assembly is provided with a movable mold insert permitting large or complex articles to be cast in separate portions without opening the mold assembly. The mold insert is movable between shots to provide adjacent portions with mating male and female ends so that the portions are interconnected as an integral part of the casting process.

The mold insert is positioned at each location where a joint is to be created. The insert defines a male void for defining a male end and a female void for defining a female end that is large enough to at least partially surround the male end. In operation, the mold insert is moved into a first position in which the male void communicates with a first portion of the mold cavity. Molten material is introduced into the first portion to form a first portion of the article with a male end. After the first portion is sufficiently cured, the mold insert is moved into a second position in which the female void communicates with a second portion of the mold cavity and surrounds the male end of the first portion. Molten material is introduced into the second portion of the cavity to form a second portion of the article with a female end at least partially surrounding the male end of the first portion.

The present invention provides a simple and effective mold assembly that allows large and/or complex articles to be cast or molded in sequential shots without opening the die cavity. The mold insert provides a cast joint between adjacent portions thereby eliminating the need to assemble the portions after casting.

These and other objects, advantages, and features of the invention will be more readily understood and appreciated by reference to the detailed description of the preferred embodiment and the drawings.

DETAILED DESCRIPTION OF THE PREFERRED EMBODIMENTS

Figure 1:
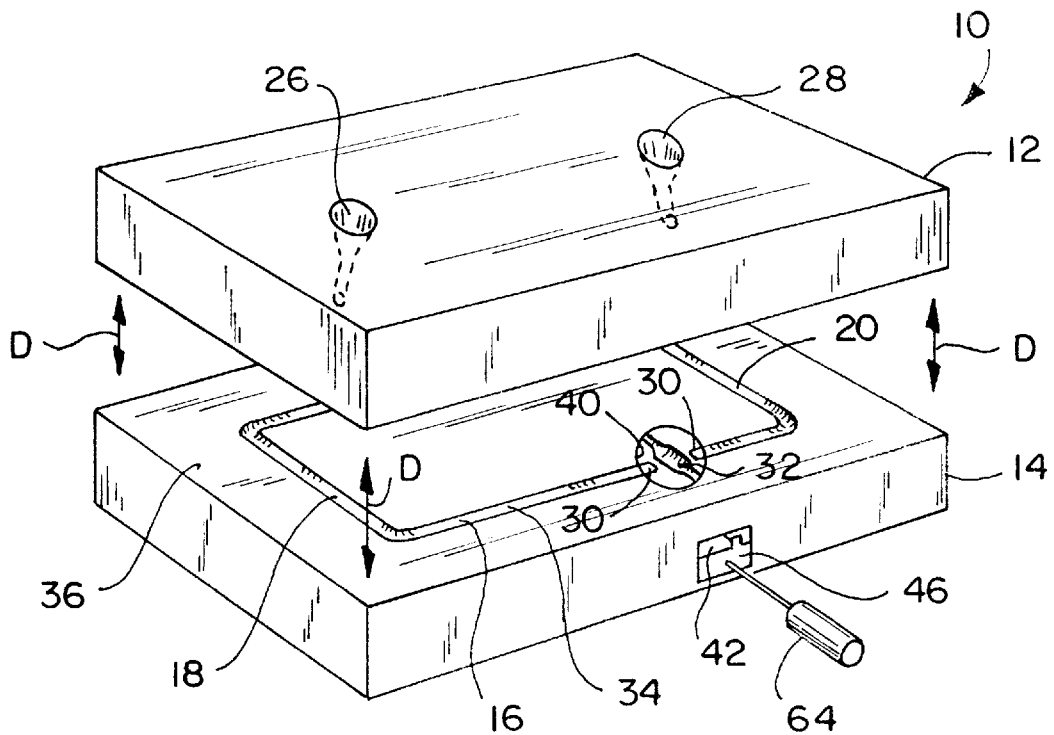
FIG. 1 is an exploded perspective view of the mold assembly.

A mold assembly according to a preferred embodiment of the present invention is illustrated in FIG. 1 and generally designated 10. The present invention is described in connection with a conventional gravity-pour mold assembly adapted to cast a rectangular aluminum frame. The present invention is well suited for use with other materials (e.g. metal, plastic and ceramic) and other types of casting and molding apparatus. For example, the present invention can be used in conjunction die casting apparatus, such as the apparatus disclosed in U.S. Pat. No. 5,730,204 entitled MULTISHOT DIE CASTING APPARATUS filed on even date herewith by Shimmell, which is incorporated herein by reference.

The mold assembly 10 includes a top mold half 12 and a bottom mold half 14 that are opened and closed as indicated by arrows D using conventional apparatus. When closed, the mold halves 12 and 14 cooperate to define a mold cavity 16 in the shape of the article to be cast. The mold cavity 16 is divided into first and second portions 18 and 20 by mold inserts 22 and 24 (See also FIG. 2). The article is cast in two separate portions by separately filling these two cavity portions 18 and 20 in sequential shots. The mold inserts 22 and 24 each define a first or male void 30 for forming a male end and a second or female void 32 for forming a female end. For purposes of this disclosure, the term "male void"

refers to a void which, when used in casting, casts a male end, and the term "female void" refers to a void, which when used in casting, casts a female end. Before the first portion is cast, the inserts 22 and 24 are oriented to provide the first portion with male ends. After the first portion is cast, the inserts 22 and 24 are rotated to provide the second cast portion with female ends that at least partially surround the male ends of the first portion. Once the second portion is cast and sufficiently cured, the mold assembly 10 is opened and the article is removed. The male ends of the first portion interconnect with the female ends of the second portion to interlock the two portions and form the complete article.

The top mold half 12 is generally conventional and therefore will not be described in detail. Suffice it to say that top mold half 12 defines inlet 26 extending entirely therethrough for introducing molten material into the first cavity portion 18 and inlet 28 extending entirely therethrough for introducing molten material into the second cavity portion 20. The inlets 26 and 28 are generally conventional and are adapted to receive molten material from conventional gravity-pouring apparatus.

Figure 2:
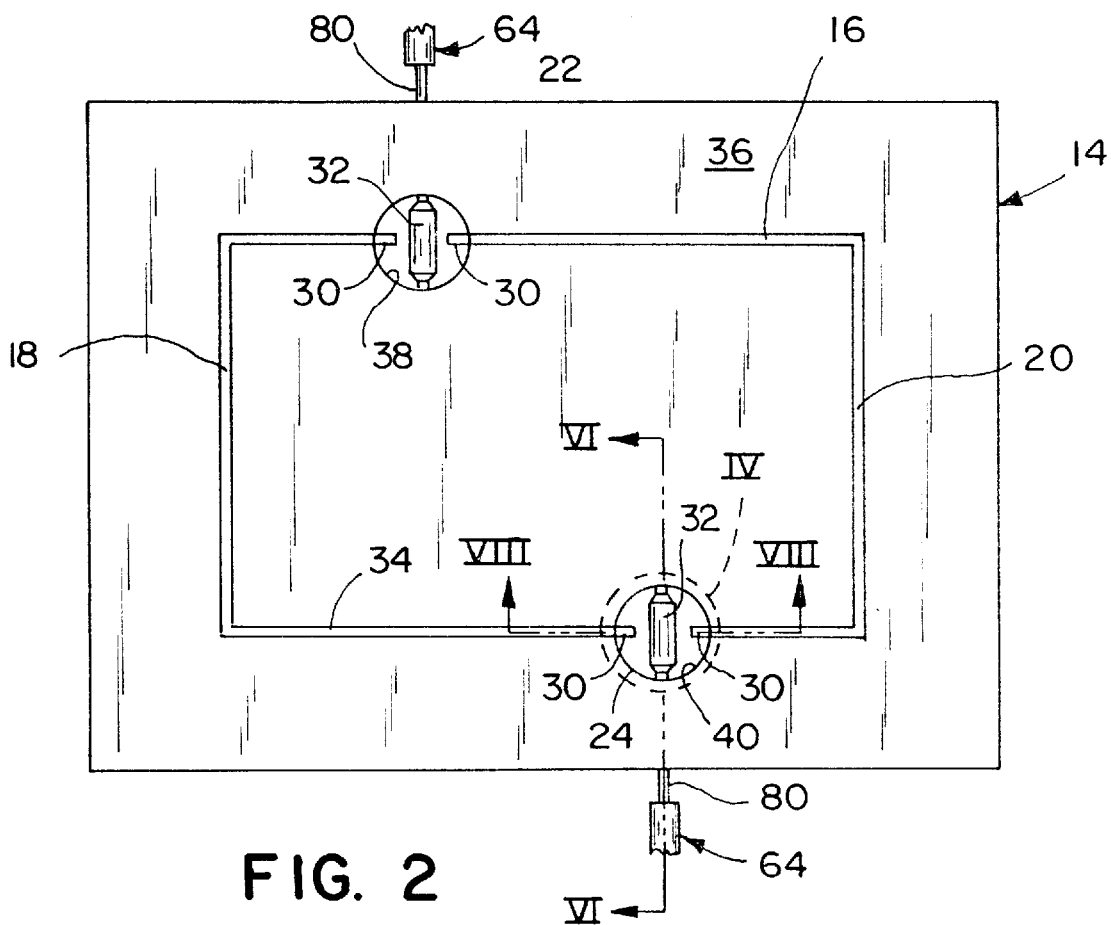
FIG. 2 is a top plan view of the bottom mold half.
Figure 6:
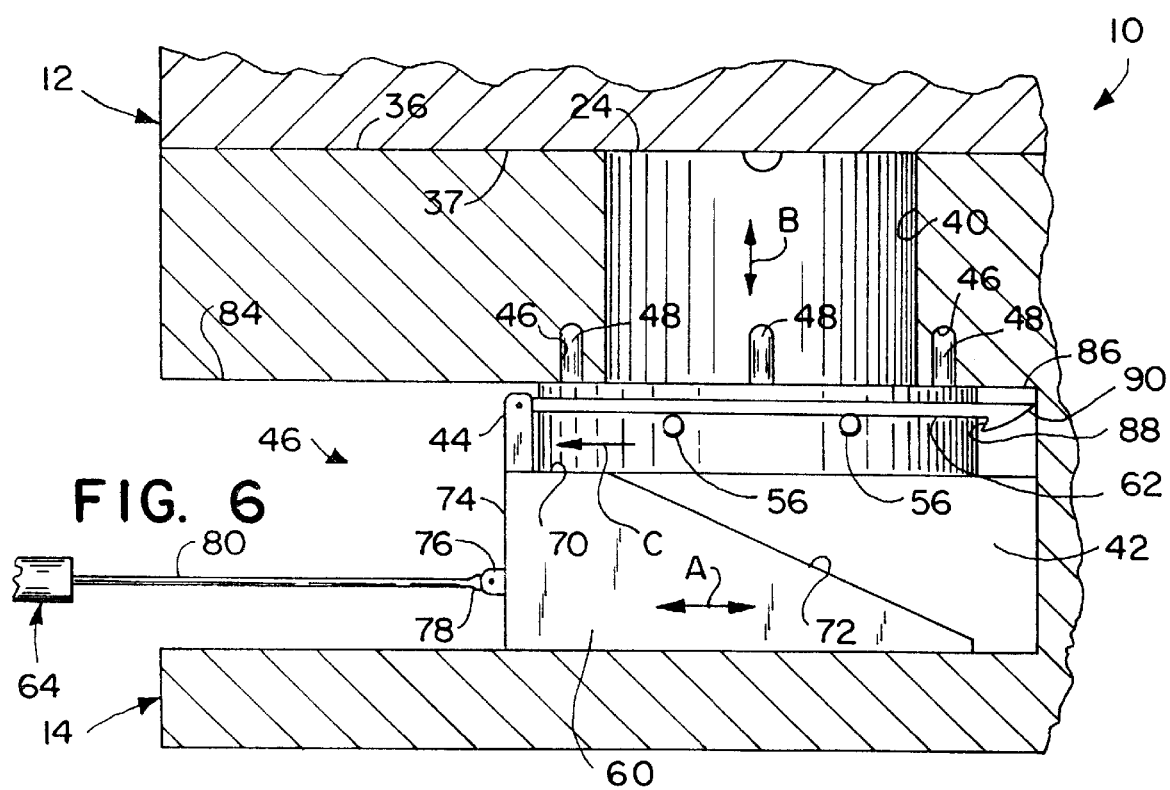
FIG. 6 is a sectional view of a portion of the mold assembly taken along line VI—VI of FIG. 2 showing the mold closed and the insert in the casting position.

As perhaps best illustrated in FIG. 2, the bottom mold half 14 is generally rectangular and includes a top surface 36 that mates with the bottom surface 37 of the top mold half 12 when the mold assembly 10 is closed. The top surface 36 of the bottom mold half 14 defines a trough 34 in the shape of the article to be cast. When the mold assembly 10 is closed, the wall of the trough 34 cooperates with the bottom surface 37 of the top mold half 12 to define the mold cavity 16. The bottom mold half 14 also includes mold inserts 22 and 24. The mold inserts 22 and 24 are positioned along and divide the trough 34 into two distinct segments or cavity portions 18 and 20. A pair of cylindrical voids 38 and 40 are defined in the bottom mold half 12 to seat the mold inserts 22 and 24. Beneath each cylindrical void 38 and 40, a rectangular void 42 is defined to seat the mold insert actuating mechanism 46 (See FIGS. 6 an 7). Also, a plurality of insert alignment bores 46 are defined in the top surface 44 of the rectangular void 42. These bores 46 are spaced at ninety degree intervals around cylindrical void 40 and are adapted to receive the mold insert alignment pins 48 as described below.

Figure 3:
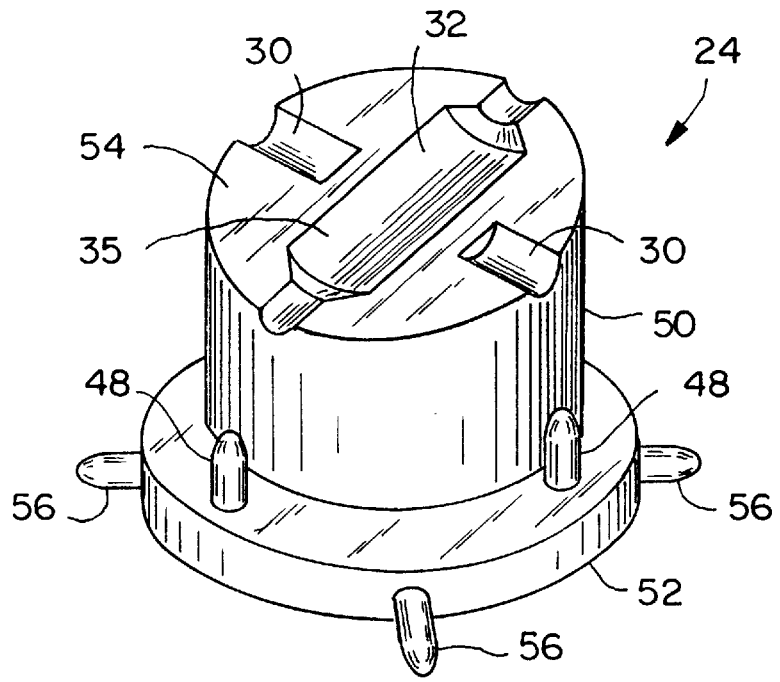
FIG. 3 is a perspective view of the mold insert.
Figure 4:
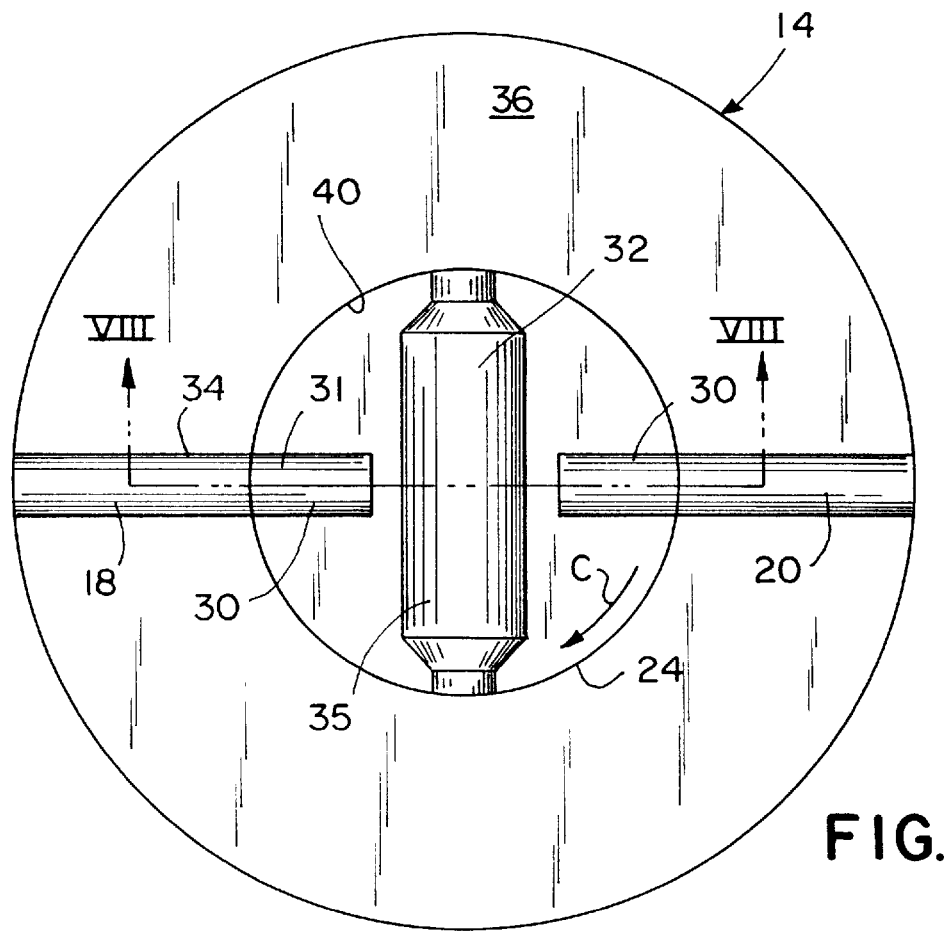
FIG. 4 is an enlarged view of the area within line IV in FIG. 2 showing the mold insert in the first or male position.
Figure 5:
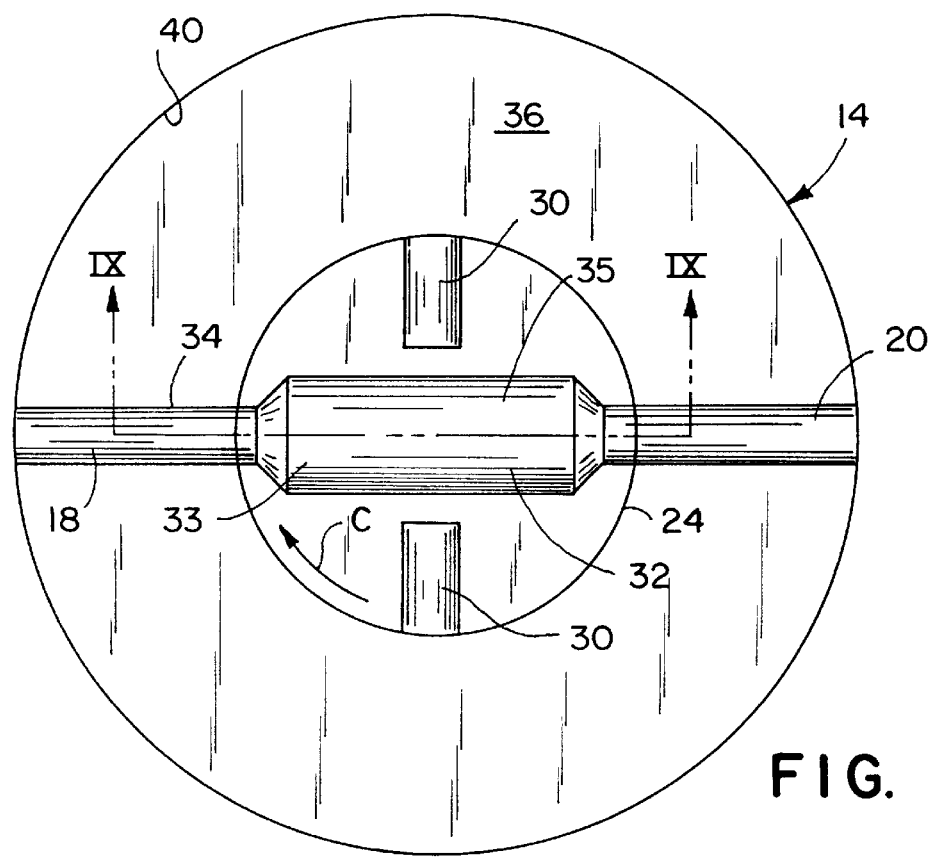
FIG. 5 is an enlarged view similar to FIG. 4 showing the mold insert in the second or female position.

The mold inserts 22 and 24 are identical and therefore only insert 24 will be described in detail. As shown in FIG. 3, the mold insert 24 includes a generally cylindrical body 50 and a disc-shaped skirt 52 mounted to the bottom of the body 50. The top surface 54 of the body 50 defines a pair of voids 30 each shaped to form a male portion end and a single void 32 shaped to form a female portion end. The second void 32 is of sufficient dimension to partially surround a male portion end formed by either of the first voids 30. As illustrated, voids 30 are semi-cylindrical and void 32 includes a semi-cylindrical portion 35 having a radius substantially greater than that of said first void. A plurality of alignment pins 48 extend upwardly from the skirt 52. The alignment pins are spaced around the skirt at ninety degree intervals. The insert 24 also includes a plurality of pawls extending outwardly from the skirt 52. The pawls are spaced around the skirt at ninety degree intervals and are offset forty-five degrees from the alignment pins 48.

Figure 7:
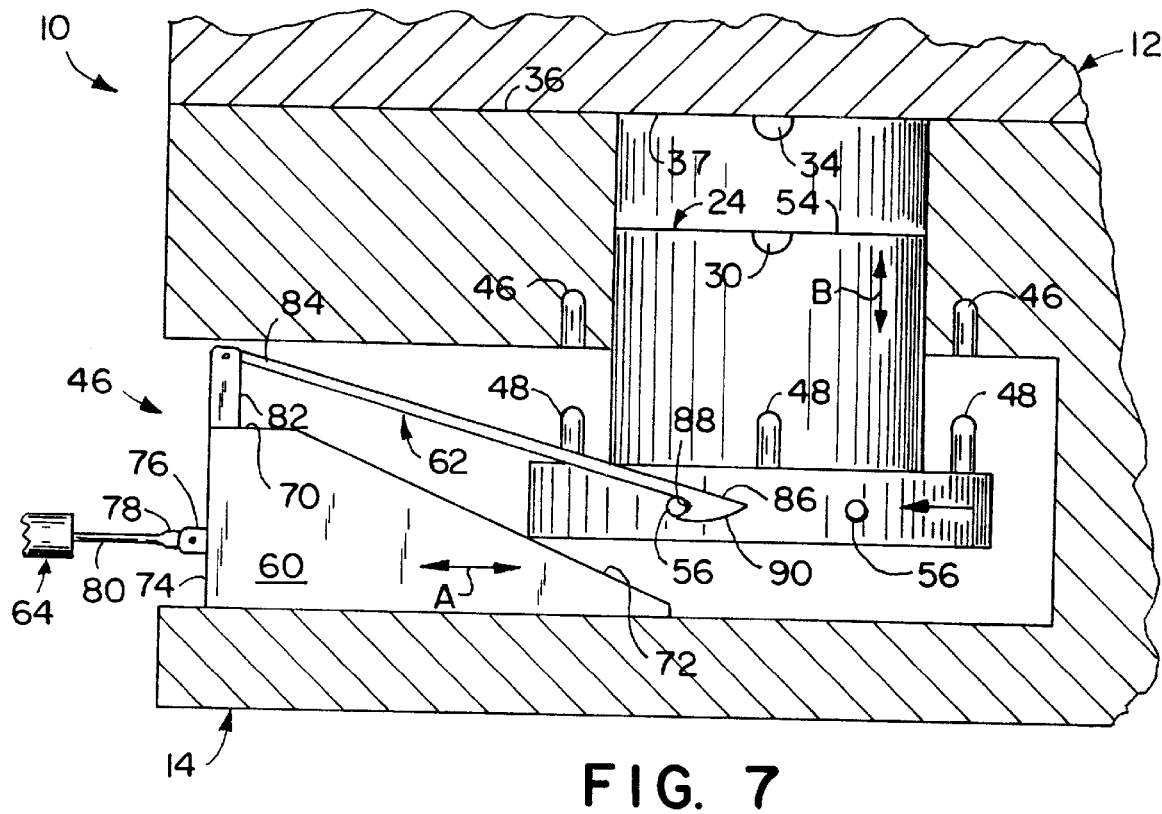
FIG. 7 is a sectional view similar to FIG. 6 showing the insert in the retracted position.

As noted above and as illustrated in FIGS. 6 and 7, the mold insert actuating mechanism 46 is seated within rectangular void 42. The actuating mechanism 46 includes a wedge-shaped base plate 60 and a ratchet arm 62 pivotally attached to the upper surface thereof. The base plate 60 includes a generally horizontal upper surface 70, an inclined inner end 72, and a generally vertical outer end 74. The upper surface 70 extends partially below the insert 24 when the actuating mechanism 46 is extended (See FIG. 6). A clevis 76 is mounted to the outer end 74 to pivotally receive the free end 78 of the cylinder rod 80 Also, a mount 82 is attached to the top surface 70 to pivotally receive ratchet arm 62. The ratchet arm 62 is generally conventional and includes a free end 84 and a hook end 86. The hook end 86 includes a hooked surface 88 adapted to catch on any one of the pawls 56 when the actuating mechanism 46 is retracted and a sloped surface 90 adapted to slide freely over the pawls 56 when the actuating mechanism 46 is extended.

Operation

Figure 8:
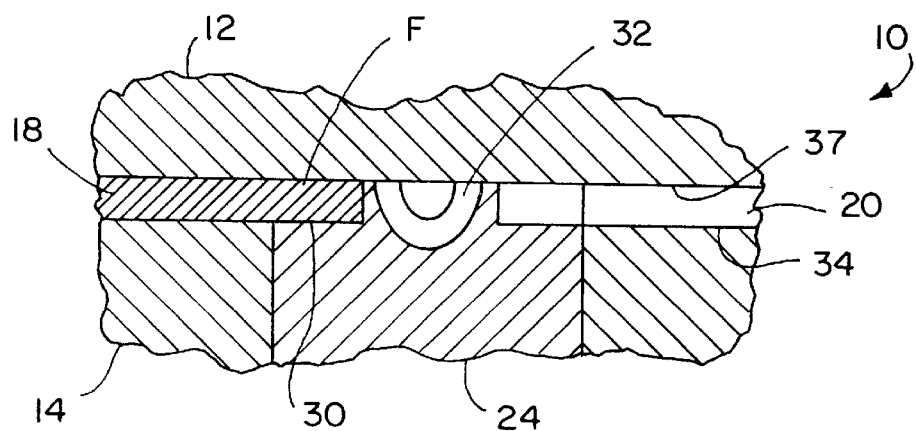
FIG. 8 is sectional view of a portion of the mold assembly taken along line VIII—VIII of FIG. 2 showing the mold insert in the male position and the first portion cast.

In preparation for casting, the top mold half 12 is lowered onto the bottom mold half 14 to close the mold assembly 10 and define mold cavity 16. Also, both mold inserts 22 and 24 are rotated into the first position as shown in FIG. 2. In this position, void 30 occupies an area 31 aligned with trough 34 to define a semi-cylindrical male void at each end of the first cavity portion 18. The first shot of molten material is then introduced into the first cavity portion 18 through inlet 26. The molten material flows down inlet 26 into trough 34 to fill the first cavity portion 18 including voids 30. FIG. 8 is a sectional view showing the first cast portion F and the mold insert 24 while it is still in the first position.

Figure 9:
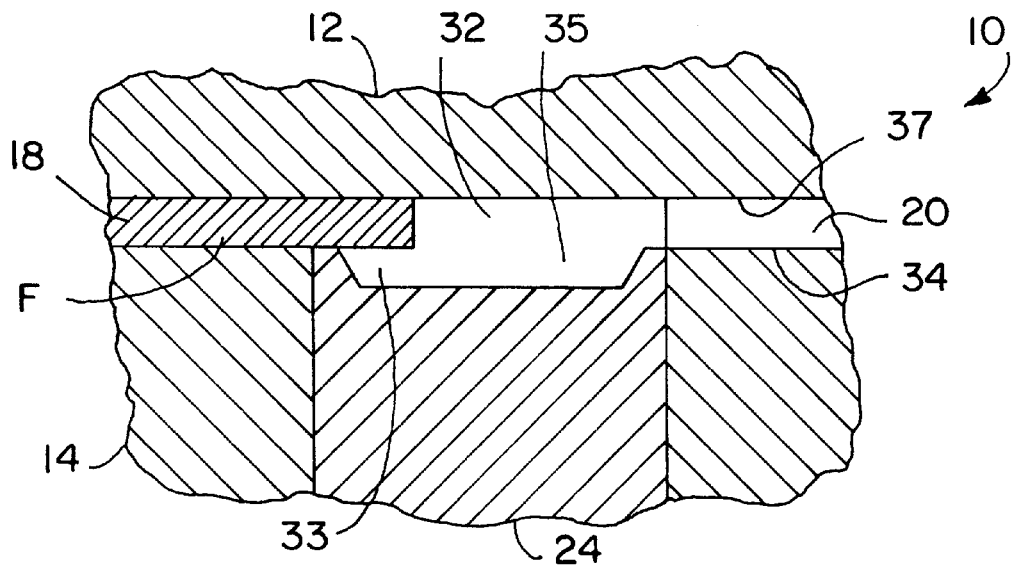
FIG. 9 is a sectional view similar to FIG. 8 showing the first portion cast and the mold insert in the female position ready for the second portion to be cast.

After the first shot is cured sufficiently to permit the insert to be retracted, the actuating mechanism 46 is operated to lower the mold insert 24, to rotate the insert into the second position, and to raise the insert back into position. The base plate 60 and ratchet arm 62 are retracted as indicated by arrow A through operation of hydraulic cylinder 64. As the actuating mechanism 46 is retracted, the wedge-shaped base plate 60 is retracted lowering the insert 24 as indicated by arrow B (Compare FIGS. 6 and 7). This frees the insert 24 from the first cast portion F and withdraws the alignment pins 48 are from the alignment bores 46. The mold assembly 10 can be provided with a spring or other mechanism to bias the insert 24 in the lower position. Simultaneously, the ratchet arm 62 (which is retracted along with the base plate 60) catches on one of the insert pawls 56 to rotate the insert 24 ninety degrees as indicated by arrow C. Because the insert 24 is lowered, it is free to rotate without interference from the alignment pins 48 or the first cast portion F. The actuating mechanism 46 is then immediately extended by operation of hydraulic cylinder 64. As the hydraulic cylinder 64 extends, the base plate 60 is returned to its initial position beneath the insert 24. This lifts the insert 24 back into the position shown in FIG. 6 with the second void 32 partially surrounding the male end of the first cast portion F (See FIG. 9). As the insert 24 is lifted, the alignment pins 48 fit within the alignment bores 46 to ensure proper alignment. The ends of the alignment pins 48 are rounded to accommodate for slight misalignment. Also, the ratchet arm 62 is pushed back across the pawls 56 to its original position. The sloped surface 90 permits the ratchet arm 62 to return without catching on the pawls 56.

The rotated inserts 22 and 24 define female voids at opposite ends of the second cavity portion 20. At each end, the female void 32 includes a semi-cylindrical portion 35 that is circumferentially spaced from the area 31 occupied by the semi-cylindrical male void 30 during the first shot. Consequently, the female voids 32 partially surround the male ends of the first cast portion F (See FIG. 9). The second shot of molten material is then introduced into the second cavity portion 20 through inlet 28. The molten material fills the second cavity portion 20 including voids 32. The female ends of the second portion partially surround the male ends of the first portion to interconnect the portions. Once the second portion is sufficiently cured, the mold assembly 10 is opened and the cast article is removed. The mold assembly 10 can be closed and the process repeated for the desired number of portions.

Alternative Embodiment

Figure 10:
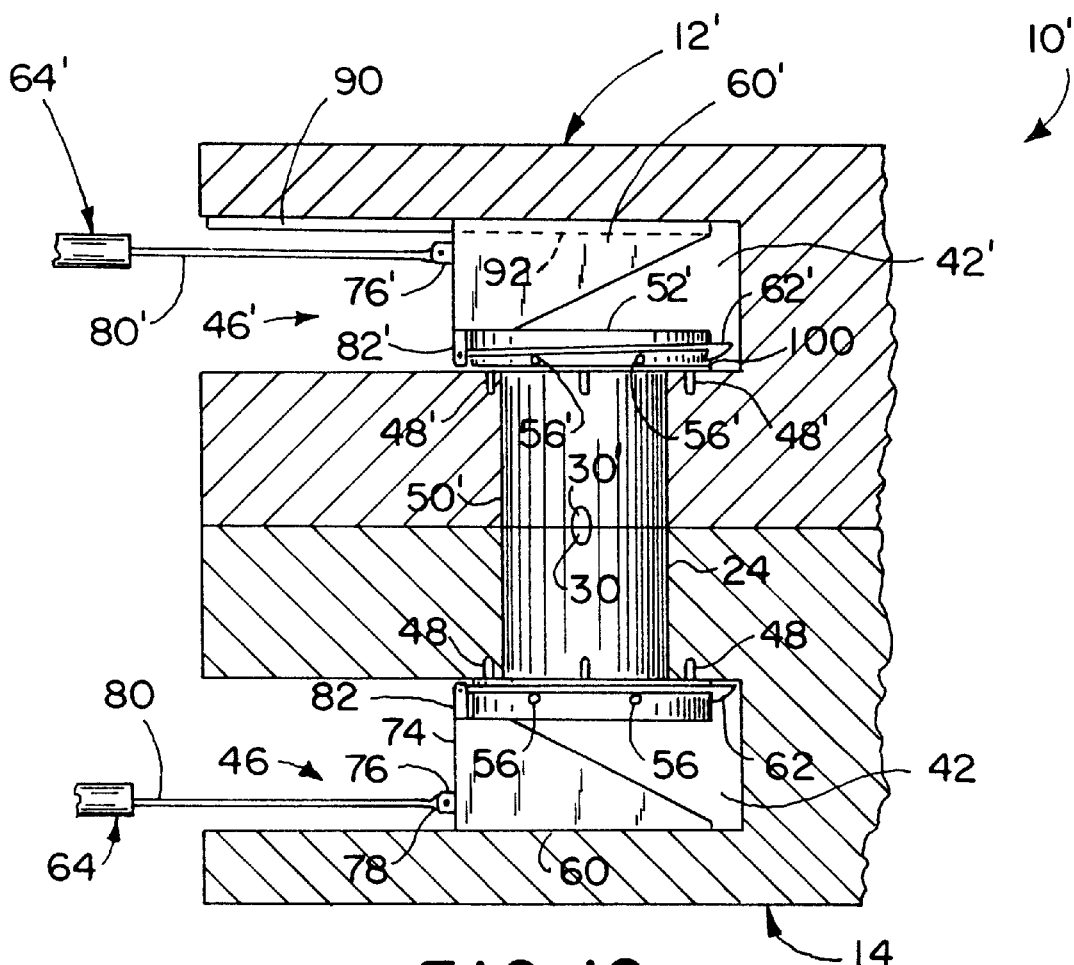
FIG. 10 is a sectional view similar to FIG. 6 showing an alternative mold assembly with cooperating mold inserts.
Figure 11:
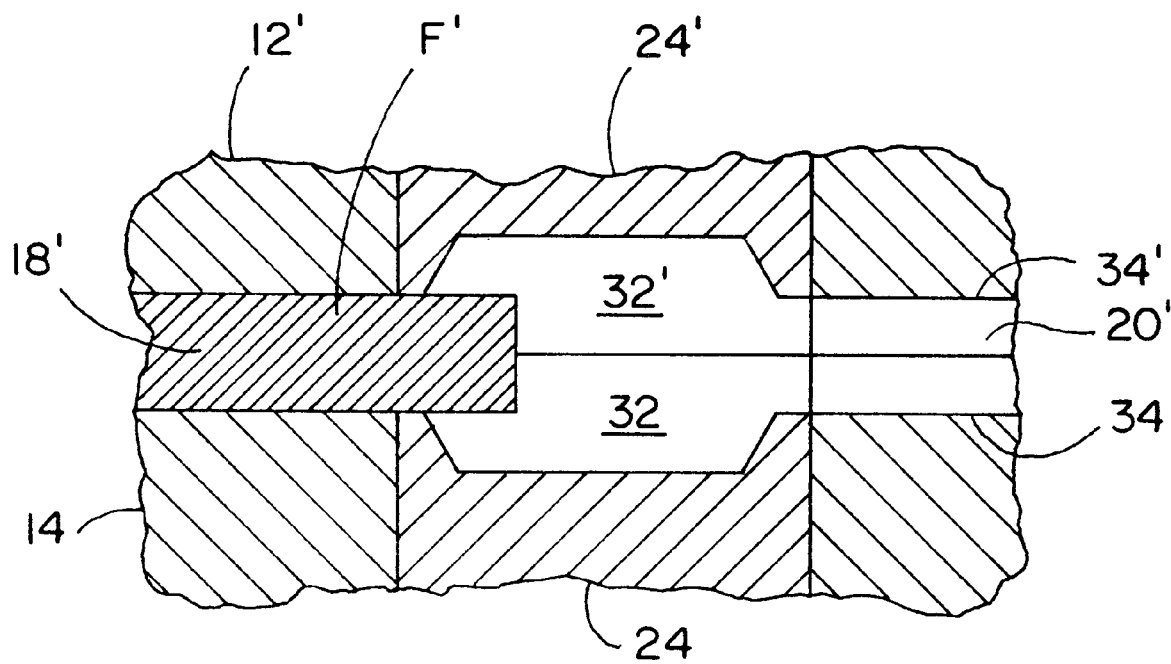
FIG. 11 is a sectional view similar to FIG. 9 showing a portion of the alternative mold assembly with the first portion cast and both mold inserts in the female position ready for the second portion to be cast.

In an alternative embodiment illustrated in FIGS. 10 and 11, the top mold half is provided with a trough and mold inserts that mate with the trough and mold inserts of the bottom mold half. In this embodiment, the female ends of the second portion entirely surround the male ends of the first portion providing an improved connection therebetween. The top mold inserts are generally identical to the bottom mold inserts 22 and 24. As best illustrated in FIG. 10, the top mold insert 24' includes body 50' and skirt 52'. The body 50' defines a first or male void 30' and a second or female void 32' (as shown in FIG. 11) which are identical to voids 30 and 32 of the preferred embodiment. The insert 24' also includes alignment pins 48' and pawls 56' extending from the skirt 52'. The top mold half 12' further includes a spring 100 or other similar mechanism to lift the mold insert 24' away from the mold cavity when the base plate 60' is retracted.

The mold insert 24' is operated by an actuating mechanisms 46' that is generally identical to the actuating mechanism 46 of the preferred embodiment. The actuating mechanism 46' includes a base plate 60' and a ratchet arm 62' pivotally secured to the base plate 60' by mount 82'. The base plate 60' defines a dove tail groove 92 that is slidably interfitted with dove tail runner 90. The groove 92 and runner 90 cooperate to slidably secure the base plate 60' to the top surface of rectangular void 42'. The actuating mechanism 46' is extended and retracted by a hydraulic cylinder 64' having a rod 80' that is pivotally attached to the base plate 60' at clevis 76'. In operation, the actuating mechanisms 46 and 46' are operated in unison to simultaneously move both insert 24 and 24' between the first and second positions.

The above descriptions are those of preferred embodiments of the invention. Various alterations and changes can be made without departing from the spirit and broader aspects of the invention as defined in the appended claims, which are to be interpreted in accordance with the principles of patent law including the doctrine of equivalents.

I claim:

1. A method for molding an article in separate portions comprising the steps of:

providing a mold assembly having a mold insert and defining a mold cavity wherein the mold cavity is divided into first and second cavity portions by the mold insert, the mold insert defining a male void and a female void;

moving the mold insert into a first position with the male void communicating with the first cavity portion;

introducing molten material into the first cavity portion and the male void to form a first portion having a male end, the male end formed by molten material introduced into the male void;

moving the mold insert into a second position with the female void communicating with the second cavity portion wherein the female void at least partially surrounds the male end of the first portion; and introducing molten material into the second cavity portion and the female void to form a second portion having a female end at least partially surrounding the male end, the female end formed by molten material introduced into the female void.

2. A method for molding an article in separate portions comprising the steps of:

providing a mold assembly having a mold insert and defining a mold cavity wherein the mold cavity is divided into first and second cavity portions by the mold insert;

moving the mold insert into a first position to define a male void communicating with the first cavity portion;

introducing molten material into the first cavity portion to form a first portion having a male end;

moving the mold insert into a second position to define a female void communicating with the second cavity portion wherein the female void at least partially surrounds the male end of the first portion; and introducing molten material into the second cavity portion to form a second portion having a female end at least partially surrounding the male end;

wherein the insert is generally cylindrical, said first moving step further defined as rotating the insert with respect to the mold cavity.

3. The method of claim 2 wherein said second moving step includes the steps of:

moving the insert away from the mold cavity to free the insert from the first cast portion;

rotating the insert into the second position; and moving the insert back into alignment with the mold cavity.

4. The method of claim 3 wherein the mold assembly includes a ratchet arm and the insert includes a plurality of pawls, said rotating step further defined as retracting the ratchet arm to catch on one of the pawls and rotate the insert ninety degrees.

5. The method of claim 4 wherein the mold assembly includes a wedge-shaped base plate that is extended and retracted to move the insert toward and away from the mold cavity.

6. The method of claim 5 wherein the base plate and ratchet arm are extended and retracted simultaneously.

7. A method for casting an article comprising the steps of:

providing a mold assembly defining a mold cavity;

providing a mold insert dividing the mold cavity into distinct first and second portions, the mold insert defining a male void and a female void, introducing molten material into the first portion to cast a first portion, the male void communicating with the first portion and receiving molten material to provide the first cast portion with a male end;

moving the mold insert such that the female void is in communication with the second portion and at least partially surrounding the male end of the first cast portion; and introducing molten material into the second portion to cast a second portion, the female void receiving molten material to provide the second cast portion with a female end at least partially surrounding the male end of the first cast portion.

8. The method of claim 7 wherein the insert is generally cylindrical, said moving step further defined as rotating the insert with respect to the mold cavity.

9. The method of claim 7 wherein said moving step is further defined as moving the insert away from the mold cavity to free the insert from the first cast portion;

rotating the insert; and moving the insert back into alignment with the mold cavity.

10. A method of molding/casting an article comprising:

closing mold halves to define first and second cavity portions generally adjacent one another and separated by a mold insert;

molding/casting a first portion of the article within the first cavity portion, the first article portion having a male end formed by a male void defined in the mold insert;

rotating the mold insert, molding/casting a second portion of the article within the second cavity portion, the second article portion having a female end capturing the male end, the female end formed by a female void defined in the mold insert, the mold halves remaining closed at all times during and between said first and second molding steps.

11. A method of molding/casting an article comprising:

dividing a mold into first and second portions by a mold insert, the mold insert defining a male void and a female void;

molding/casting a first portion of the article within the first portion of the mold, the male void providing the first portion of the article with a male end;

allowing the first portion of the article to set;

molding/casting a second portion of the article within the second portion of the mold, the female void providing the second portion of the article with a female end capturing the male end of the fist portion of the article; and keeping the mold closed during and between all of the foregoing steps.

12. The method of claim 11 further comprising the step of moving a mold insert after said allowing step.

* * * * *